United States Patent
Wunder et al.

(10) Patent No.: US 9,680,182 B2
(45) Date of Patent: Jun. 13, 2017

(54) SOLID POLYMER ELECTROLYTE COMPOSITION FOR LITHIUM ION BATTERY

(71) Applicant: TEMPLE UNIVERSITY—OF THE COMMONWEALTH SYSTEM OF HIGHER EDUCATION, Philadelphia, PA (US)

(72) Inventors: Stephanie L. Wunder, Chadds Ford, PA (US); Parameswara Rao Chinnam, Philadelphia, PA (US)

(73) Assignee: TEMPLE UNIVERSITY—OF THE COMMONWEALTH SYSTEM OF HIGHER EDUCATION, Philadelphia, PA (US)

( * ) Notice: Subject to any disclaimer, the term of this patent is extended or adjusted under 35 U.S.C. 154(b) by 400 days.

(21) Appl. No.: 14/399,433

(22) PCT Filed: Mar. 14, 2013

(86) PCT No.: PCT/US2013/031541
§ 371 (c)(1),
(2) Date: Nov. 6, 2014

(87) PCT Pub. No.: WO2013/169370
PCT Pub. Date: Nov. 14, 2013

(65) Prior Publication Data
US 2015/0140441 A1    May 21, 2015

Related U.S. Application Data

(60) Provisional application No. 61/644,235, filed on May 8, 2012.

(51) Int. Cl.
  H01M 10/0565   (2010.01)
  H01M 10/0525   (2010.01)

(52) U.S. Cl.
  CPC ... H01M 10/0565 (2013.01); H01M 10/0525 (2013.01); H01M 2220/10 (2013.01);
  (Continued)

(58) Field of Classification Search
  CPC .................. H01M 10/0565; H01M 2300/0082
  (Continued)

(56) References Cited

U.S. PATENT DOCUMENTS

2006/0175684 A1* 8/2006 Oikawa ............... C07F 7/21
                                                            257/632
2010/0021788 A1   1/2010 Kumagai et al.

OTHER PUBLICATIONS

Chinnam et al. Nanostructured Polymer Electrolytes for Lithium Ion Batteries. The Electrochemical Society. 219th ECS Meeting, Abstract #326. 2011. [retrieved on May 14, 2013]. Retrieved from the Internet. <URL:http://ma.ecsdl.org/content/MA2011-01/6/326.full.pdf> entire document.
(Continued)

*Primary Examiner* — Basia Ridley
*Assistant Examiner* — James Erwin
(74) *Attorney, Agent, or Firm* — Drinker Biddle & Reath LLP

(57) ABSTRACT

A composition suitable as a solid polymer electrolyte for a lithium ion battery comprises a mixture of polyoctahedral silsesquioxane-phenyl$_7$(BF3Li)$_3$ and a poly(ethylene oxide).

41 Claims, 5 Drawing Sheets

(52) U.S. Cl.
CPC .... *H01M 2220/20* (2013.01); *H01M 2220/30* (2013.01); *H01M 2300/0082* (2013.01)

(58) Field of Classification Search
USPC .......................................................... 429/309
See application file for complete search history.

(56) References Cited

OTHER PUBLICATIONS

Zhang et al. Blends of POSS-PEO(n=4)(8) and high molecular weight poly(ethylene oxide) as solid polymer electrolytes for lithium batteries. The Journal of Physical Chemistry B. 111(14); 3583-90. Apr. 12, 2007. [retrieved on May 15, 2013]. Retrieved from the Internet. <URL:http://www.ncbi.nlm.nih.gov/pubmed/17388529> entire document.

Zhang. Solid polymer electrolytes for lithium ion batteries: Preparation and electrochemical evaluation. Temple University. Doctoral Dissertation. Apr. 27, 2006. [retrieved on May 15, 2013]. Retrieved from ProQuest. <URL:http:// search.proquest.com/docview/304980244/13E0FEC2EE74D652FF0/1?accountid=142944>. entire document.

\* cited by examiner

SOLID POLYMER ELECTROLYTE COMPOSITION FOR LITHIUM ION BATTERY

CROSS-REFERENCE TO RELATED APPLICATION

The benefit of the filing date of U.S. Provisional Patent Applications No. 61/644,235, filed May 8, 2012 is hereby claimed. The entire disclosure of the aforesaid application is incorporated herein by reference.

FIELD OF INVENTION

The invention relates to compositions useful as solid electrolytes for lithium ion batteries.

BACKGROUND OF THE INVENTION

Electrical energy storage systems are currently used for powering portable electronic devices (such as phones and laptops), but they are increasingly required for future large battery applications, such as for plug-in hybrid vehicles/electric vehicles and for the storage of energy generated by the wind, the Sun, and nuclear fusion. Because rechargeable (secondary) lithium and lithium ion batteries have some of the highest energy storage capabilities, there has been extensive research to improve their energy density, power density, and safety, as risks increase with the size of the energy-storage device. Failure mechanisms and safety hazards in lithium and lithium ion batteries arise as a result of the development of shorts between the anode and cathode after many charge/discharge cycles, as the result of lithium dendrite formation (when lithium metal is used) and the presence of both a combustible material and an oxidizing agent, which can result runaway reactions and fires or explosions.

Demand for safe, high capacity electrical energy storage devices has motivated the development of solid polymer electrolytes (SPEs) that are compatible with lithium metal, and thus could utilize its high specific capacity (3860 mA h g$^{-1}$). SPEs, of which the most investigated has been polyethylene oxide (PEO), are flexible compared with inorganic solid electrolytes, and do not suffer from safety issues such as leakage, shorts due to dendrite formation, and explosions due to volatile solvents that occur in the liquid electrolytes currently used in lithium ion batteries; further, they have longer cycle life due to the slower migration of degradation products in solid compared with liquid electrolytes to reactive centers in the electrodes. SPEs are critical components on the anode side in cathode flow batteries. However, SPEs have lower ambient temperature ionic conductivities, σ, (σ<10$^{-5}$ S/cm) than either liquid or gel electrolytes.

Attempts to improve the ambient and sub-ambient temperature conductivity (σ) of solid polymer electrolytes often have yielded materials with poor mechanical properties. Single ion conductors, in which the anion is immobile, have even lower room temperature (RT) ionic conductivities (<10$^{-6}$ S/cm), but have lithium ion transference numbers, $t_{Li+}$, the fraction of the charge carried by Li$^+$, that approach 1, so that in principle all of the conductivity, although low, originates from the migration of the electroactive lithium species (M. Doyle et al., Electrochimica Acta 1994, 39, 2073; Thomas et al., Journal of Power Sources 2000, 89, 132). By contrast, lithium ion transference numbers for PEO electrolytes with mono-ionic lithium salts (LiX), where X is the anion, are typically $t_{Li+}$ in the range 0.2-0.3 (Gray, Solid Polymer Electrolytes-Fundamentals and Technical Applications, VCH, Wenheim 1991; Shin et al., Journal of the Electrochemical Society 2005, 152, A283; Stephan et al., Journal of Physical Chemistry B 2009, 113, 1963).

Previous attempts to improve conductivity (σ), interfacial and transport properties of PEO, which have included the addition of plasticizers (Kim et al., Solid State Ionics 2002, 149, 29) and nanoparticle fillers such ceramic ZrO$_2$, SiO$_2$ (Kim et al., Electrochimica Acta 2007, 52, 3477), Al$_2$O$_3$ (Croce et al., Nature 1998, 394, 456; Croce et al., Journal of Physical Chemistry B 1999, 103, 10632), chitin (Stephan et al. et al., Journal of Physical Chemistry B 2009, 113, 1963) and polyphosphazine (Zhang et al., Electrochimica Acta 2011, 55, 5966). However, comprehensive evaluation showed minimal improvement in conductivity (Syzdek et al., Electrochimica Acta 2010, 55, 1314). Conduction in PEO based electrolytes occurs predominantly in the amorphous phase, but amorphous PEO, even with added salt or fillers, is a viscous liquid. Thus, preparation of SPEs/SICs from PEO has consisted of engineering a two phase morphology in which there is both a structural and a conductive phase, either through block copolymers, or polymers with pendant oligomeric polyethylene glycols (PEGs). However, conductivity has been shown to increase in two phase morphologies for higher molecular weight PEOs (Gomez et al., Nano Letters 2009, 9, 1212; Panday et al., Macromolecules 2009, 42, 4632.

Chinnam and Wunder, Chemistry of Materials 2011, 23, 5111, describe mixtures of POSS-PEG$_8$, a polyoctahedral silsesquioxane functionalized with eight PEG, —(CH$_2$CH$_2$O)$_m$—, chains (m~13.3) and the multi-ionic lithium salt, POSS-phenyl$_7$(BF$_3$Li)$_3$, made by reaction of POSS-phenyl$_7$Li$_3$ with BF$_3$(OC$_2$H$_5$)$_2$. POSS-phenyl$_7$(BF$_3$Li)$_3$ has Janus-like properties, with one end predominantly hydrophobic and the other end ionic in character. These blends, for which the PEG crystallized/melted below 0° C., exhibited a crystallization exotherm above 50° C., which was attributed to aggregation of the phenyl groups of POSS-phenyl$_7$(BF$_3$Li)$_3$. However, these materials remained viscous liquids unless the amount of POSS-phenyl$_7$(BF$_3$Li)$_3$ was so high that conductivity drastically decreased, as the PEG phase became discontinuous.

What is needed is an alternative approach to engineering solid polymer electrolytes with good mechanical stability as well as high ionic conductivities and high lithium ion transference.

SUMMARY OF THE INVENTION

A composition is provided comprising a polyoctahedral silsesquioxane-phenyl$_7$(BF$_3$Li)$_3$, having the formula:

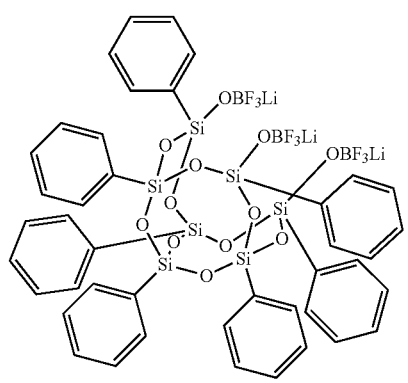

and at least one poly(ethylene oxide).

In some embodiments, the at least one poly(ethylene oxide) has a viscosity average molecular weight of from about 100K to about 1000K. In some embodiments, the at least one poly(ethylene oxide) has a viscosity average molecular weight of from about 200K to about 800K. In some embodiments, the at least one poly(ethylene oxide) has a viscosity average molecular weight of from about 400K to about 800K. In some embodiments, the at least one poly(ethylene oxide) has a viscosity average molecular weight of about 600K.

In some embodiments, the composition has an oxygen to lithium ratio of from about 4:1 to about 20:1, considering only ether oxygens in determining said ratio. In some embodiments, the composition has an oxygen to lithium ratio of from about 6:1 to about 18:1. In some embodiments, the composition has an oxygen to lithium ratio of from about 8:1 to about 16:1. In some embodiments, the composition has an oxygen to lithium ratio of about 8:1, about 10:1, about 12:1, about 14.1, or about 16:1.

In some embodiments, the composition has a percent crystallinity of less than about 4%. In some embodiments, the composition has a percent crystallinity of less than about 1%.

In some embodiments, chains of poly(ethylene oxide) connect aggregates of polyoctahedral silsesquioxane-phenyl $(BF_3Li)_3$ in the composition.

In some embodiments, the composition is formed from self-assembly of polyoctahedral silsesquioxane-phenyl$_7$ $(BF_3Li)_3$ and poly(ethylene oxide).

A process for forming a solid composition is provided. The process comprises:

(i) mixing in a solvent polyoctahedral silsesquioxane-phenyl$_7(BF_3Li)_3$, having the formula:

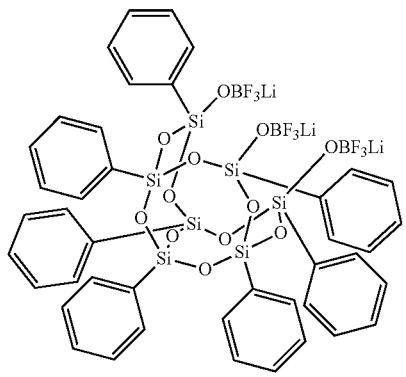

and at least one poly(ethylene oxide), and (ii) removing said solvent to form said solid composition.

In some embodiments of the process, the solvent is acetonitrile. In some embodiments, the process results in the formation of a film.

Also provided is a solid polymer electrolyte formed by self-assembly of:

(a) polyoctahedral silsesquioxane-phenyl$_7(BF_3Li)_3$, having the formula:

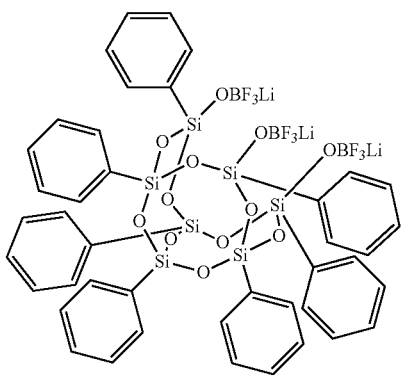

and (b) at least one poly(ethylene oxide).

In some embodiments of the solid polymer electrolyte, Si—O—BF$_3$Li groups of the polyoctahedral silsesquioxane-phenyl$_7(BF_3Li)_3$ are dissociated into Si—O—BF$_3^-$ ions and Li$^+$ ions, and said Li$^+$ ions are solvated by the at least one poly(ethylene oxide). In some embodiments of the solid polymer electrolyte, phenyl groups of the polyoctahedral silsesquioxane-phenyl$_7(BF_3Li)_3$ comprise nanometer-sized clusters in the solid electrolyte. In some embodiments of the solid polymer electrolyte, Li$^+$ ions bridge Si—OBF$_3^-$ groups of the polyoctahedral silsesquioxane-phenyl$(BF_3Li)_3$ and ether oxygens of —(OCH$_2$CH$_2$)— groups of the polyoctahedral silsesquioxane-phenyl$(BF_3Li)_3$ to form Si—O—BF$_3^-$—Li$^+$—OCH$_2$CH$_2)_n$ linkages in the solid polymer electrolyte.

In embodiments of the solid polymer electrolyte, the at least one poly(ethylene oxide) has a viscosity average molecular weight of from about 100K to about 1000K, from about 200K to about 800K, or from about 400K to about 800K. In some embodiments, the solid polymer electrolyte has a viscosity average molecular weight of about 600K.

In some embodiments, the solid polymer electrolyte, has an oxygen to lithium ratio of from about 4:1 to about 20:1, from about 6:1 to about 18:1, or from about 8:1 to about 16:1, considering only ether oxygens in determining the ratio. In some embodiments, the oxygen to lithium ratio is about 8:1, about 10:1, about 12:1, about 14:1 or about 16:1.

In some embodiments, the solid polymer electrolyte has a percent crystallinity of less than about 4%. In some embodiments, the percent crystallinity is less than about 1%.

Also provided is a battery comprising a solid electrolyte as described herein.

As envisioned in the present invention with respect to the disclosed compositions of matter and methods, in one aspect the embodiments of the invention comprise the components and/or steps disclosed herein. In another aspect, the embodiments of the invention consist essentially of the components and/or steps disclosed herein. In yet another aspect, the embodiments of the invention consist of the components and/or steps disclosed herein.

ABBREVIATIONS

"PEO" means poly(ethylene oxide).
"PEO(600K)" means poly(ethylene oxide) having a viscosity average molecular weight of 600 kilodaltons.
"POSS" means polyoctahedral silsesquioxane.
"POSS-phenyl$_7(BF_3Li)_3$" means a compound of the formula:

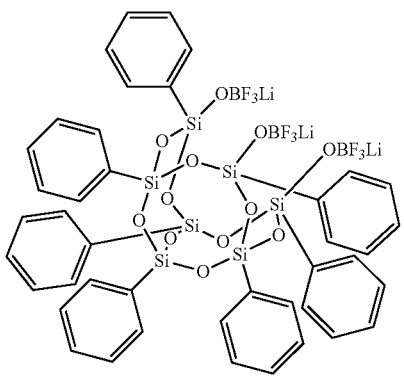

"POSS-PEG$_8$" means a polyoctahedral silsesquioxane functionalized with eight polyethylene glycol groups.

"SPE" means solid polymer electrolyte.

DETAILED DESCRIPTION OF THE INVENTION

Figure 1B:
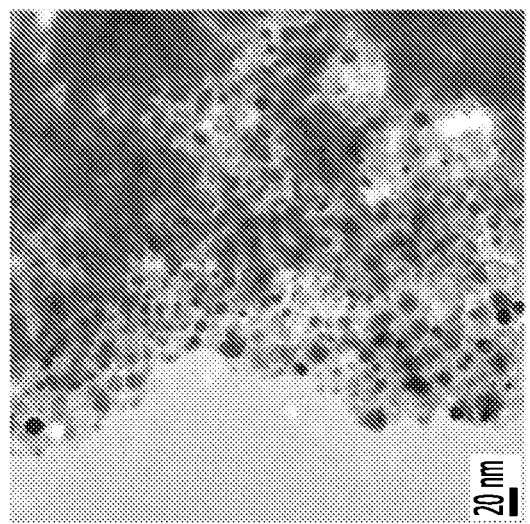
FIG. 1B shows a TEM micrograph of POSS-phenyl$_7$(BF$_3$Li)$_3$/PEO(600K) with O/Li=10/1.

A solid polymer electrolyte (SPE) of POSS-phenyl$_7$(BF$_3$Li)$_3$/PEO is provided with good mechanical stability as well a high ambient temperature ionic conductivity (~4× 10$^{-4}$ S/cm) and high lithium ion transference number (t$_{Li+}$=0.6). The SPE is characterized by a self-assembled two phase morphology in blends of a Janus-like polyoctahedral silsesquioxane (POSS) lithium salt, POSS-phenyl$_7$(BF$_3$Li)$_3$, in a high molecular weight amorphous polyethylene oxide (PEO) matrix. One phase comprises clustered phenyl groups with POSS-phenyl$_7$(BF$_3$Li)$_3^-$ anions oriented outward. The other phase comprises PEO with solvated Li$^+$.

The phenyl groups of the POSS-phenyl$_7$(BF$_3$Li)$_3$ crystallize into nanometer size clusters, as demonstrated by transmission electron microscopy (TEM). Si—O—BF$_3$Li groups in the clusters point towards the PEO phase. The clusters impart dimensional stability to the amorphous PEO by acting as cross-link sites, while Li$^+$ ions are solvated by the conductive PEO phase. This occurs as the Si—O—BF$_3$Li groups dissociate into Si—O—BF$_3^-$ and Li$^+$, and the Li$^+$ ions are then solvated by PEO. The resulting solid is formed, not by PEO crystallization, but as the result of Si—O—BF$_3^-$—Li$^+$—(OCH$_2$CH$_2$)$_n$ cross-link sites. Physical cross-links formed between PEO/Li$^+$ chains and POSS clusters provide a solid structure of the amorphous PEO matrix. The resulting solid polymer electrolyte has an electrochemical stability window of 4.6 V and excellent interfacial stability with lithium metal.

Rechargeable lithium polymer batteries are formed by a lithium metal anode, a polymer electrolyte separator and a metal oxide cathode capable of reversibly intercalating and releasing (deintercalating) lithium ions. The interfacial stability with lithium makes the SPEs of the present invention excellent materials for such lithium battery applications. Films formed from POSS-phenyl$_7$(BF$_3$Li)$_3$/PEO may be utilized as solid polymer electrolyte separators in lithium polymer batteries.

The POSS-phenyl$_7$(BF$_3$Li)$_3$/PEO SPEs of the invention may be prepared by combining POSS-phenyl$_7$(BF$_3$Li)$_3$ and PEO in an appropriate common solvent, e.g. acetonitrile. Driving away the solvent yields films of POSS-phenyl$_7$(BF$_3$Li)$_3$/PEO. POSS-phenyl$_7$(BF$_3$Li)$_3$ for this purpose may be prepared by reacting stoichiometrically equivalent amounts of BF$_3$(OC$_2$H$_5$)$_2$ with POSS-phenyl$_7$Li$_3$ in an inert atmosphere at room temperature, as further detailed in Example 1. In this manner, POSS-phenyl$_7$(BF$_3$Li)$_3$/PEO characterized by varied PEO molecular weights, and varied oxygen/lithium rations, may be prepared.

POSS-phenyl$_7$(BF$_3$Li)$_3$/PEO film samples were prepared according to Example 1 using 600 kDa molecular weight PEO ("PEO(600K)"). The samples were characterized by the following oxygen/lithium ratios (considering only ether oxygens): 8/1, 10/1, 12/1, 14/1 and 16/1. All films were hard solids both at room temperature and at 90° C.>The samples are thus referred to herein as solid polymer electrolytes (SPEs). At T>~120° C., the films became rubbery. The studies described as follows were conducted on these samples. Since T$_m$ of PEO(600K) is 65° C., this solid morphology, at least above 65° C., cannot be attributed to PEO crystallites. PEO above T$_m$ is a viscous liquid, since the glass transition temperature, T$_g$, even in the presence of lithium salt, is less than 0° C.

Figure 2A:
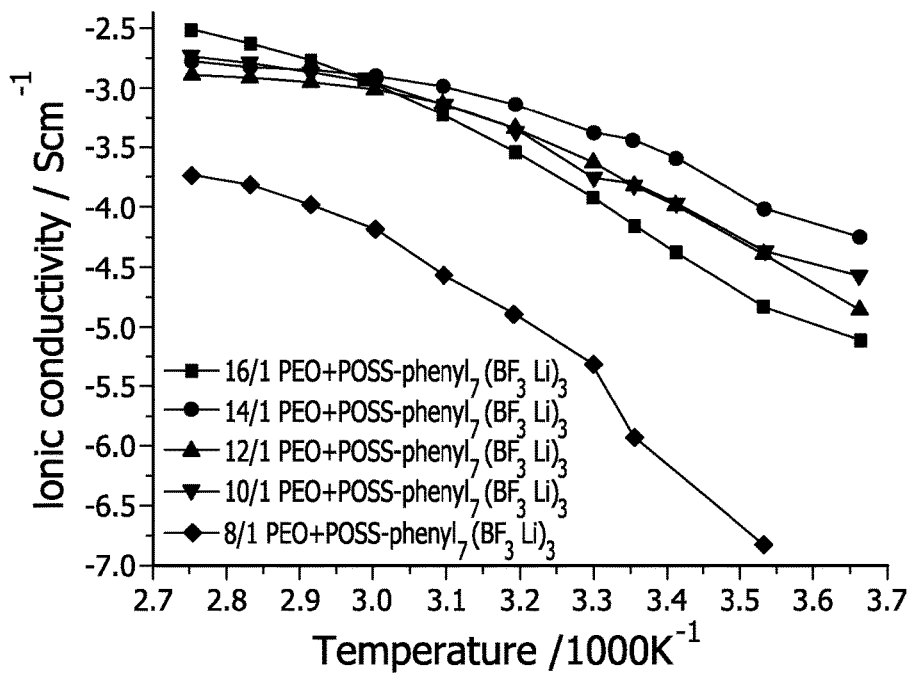
FIG. 2A shows the log (conductivity, σ) versus 1000/T for POSS-phenyl$_7$(BF$_3$Li)$_3$/PEO(600K) as a function of O/Li ratio.

Conductivity, σ, data for the POSS-phenyl$_7$(BF$_3$Li)$_3$/PEO (600K) films is presented in FIG. 2A for samples with O/Li=10/1, 12/1, 14/1 and 16/1. The data show σ>10$^{-3}$ S/cm above 60° C. Unlike neat PEO, which also exhibits similar conductivity in this range at high temperature, the samples are true solids above the melt temperature (about 60° C.) of PEO. Below 60° C., the order of conductivity was σ(8/1)<<σ(10/1)~σ(12/1)<σ(14/1)>σ(16/1). Films with O/Li of 10/1, 12/1, 14/1 were characterized by σ>1×10$^{-4}$ S/cm above 20° C. The highest ambient temperature conductivity achieved was 4×10$^{-4}$ for the O/Li=14/1 composition. The lower conductivity for O/Li=16/1 (compared with the O/Li=14/1, 12/1 and 10/1) is due to the higher PEO crystalline fraction for this sample. The highest conductivity achieved was in fact higher than that of the POSS-phenyl$_7$(BF$_3$Li)$_3$/POSS-PEG$_8$ system described by Chinnam, and Wunder, *Chemistry of Materials* 2011, 23, 5111.

Differential scanning calorimetry (DSC) of the POSS-phenyl$_7$(BF$_3$Li)$_3$/PEO (600K) samples was conducted in an effort to understand the high conductivity values measured under ambient conditions. As the O/Li ratio decreased, the percent crystallinity decreased and the glass transition, $T_g$, which is low (about −35° C.) appears. Without wishing to be bound by any theory, this phenomenon may contribute to the decrease in conductivity at O/Li=8/1. From modulated DSC analysis, the transitions at about 40-60° C. contain both $T_g$ and crystallization components.

The percent crystallinity, obtained from the values of the melt enthalpy for PEO(600K), $H\Delta_m$, normalized for the amount of PEO(600K) in the samples, was very low (about 1%), even for the SPE with the highest O/Li (16/1) ratio (<4%). The melt temperatures, $T_m$, were also reduced compared with neat PEO(600), indicating poorly formed crystallites, only shorter segment participation in crystallization, or freezing point depression due to dissolved salt. The lower value of conductivity for O/Li=16/1 (compared with the O/Li=14/1, 12/1 and 10/1) may in fact result from the higher crystalline fraction for this sample. Confirmation that the other samples had minimal crystallinity is shown by x-ray scattering data (FIG. 3C) for SPEs with O/Li=14/1 and 10/1, where no PEO(600) crystallization peaks are observed. Thus, for these SPEs, the solid structure does not originate from PEO crystallites.

The increase in the low temperature $T_g$ with increased $Li^+$ concentration (i.e. decreasing O/Li), is believed to originate from the solvation of increasing numbers of lithium ions by the PEO(600K), which stiffens the chains and bridges neighboring ethylene oxide segments, reducing their mobility. Unexpected is the appearance of a high temperature $T_g$ as more POSS-phenyl$_7$(BF$_3$Li)$_3$ is added to the SPEs, and which also coincides with the disappearance of the melt endotherm. For the O/Li=8/1 composition, this high $T_g$ transition is particularly prominent. Without wishing to be bound by any theory, and as discussed further below, this effect is believed to be due to the SPE morphology.

Confirmation that samples without melting endotherms had minimal or no crystallinity is provided by wide angle X-ray scattering (WAXS) data (FIG. 3C) for SPEs with O/Li=14/1 and 10/1, where no PEO(600) crystalline peaks are observed. Thus, for these SPEs, the solid structure even at room temperature does not originate from PEO crystallites. Evidence for crystallization of the phenyl groups of POSS-phenyl(BF$_3$Li)$_3$ is shown by WAXS scattering data (FIG. 3C), where there are sharp peaks characteristic of many POSS nanomaterials are prominent; the complex pattern is associated with more asymmetric POSS such as trisilanolphenyl-POSS(C$_{42}$H$_{38}$O$_{12}$Si$_7$) (Liang et al., *Chemistry of Materials* 2006, 18, 301). The major reflections at 2θ=11.3° and 12.18°, corresponding to d spacings of 7.8 and 7.25, respectively, are almost identical to those observed for the POSS cyclopentyl-norbornyl monomer (Waddon et al., *Chemistry of Materials* 2003, 15, 4555). However, there is no low angle peak, 2θ=7.5° (~10.5), as seen for POSS cyclopentyl-norbornyl monomers and many other POSS monomers.

Figure 1A:
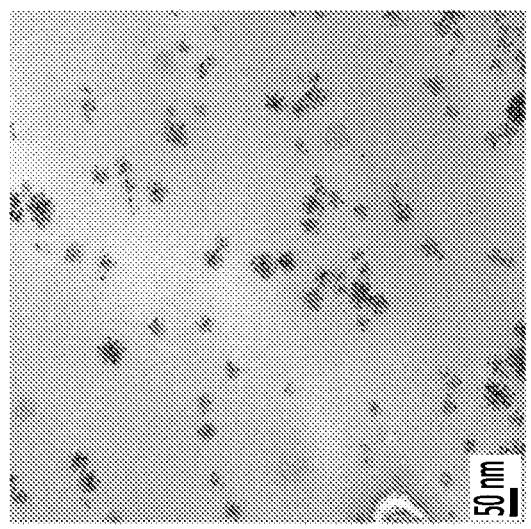
FIG. 1A shows a transmission electron micrograph (TEM) of POSS-phenyl$_7$(BF$_3$Li)$_3$/PEO(600K) with O/Li=14/1.

TEM images clearly show aggregation of the POSS-phenyl$_7$(BF$_3$Li)$_3$. Spherical structures with distribution of diameters between about 5 and 20 nm are observed in TEM, as shown in FIGS. 1A (O/Li=14/1) and 1B (O/Li=10/1). The distribution increases in density with decreased O/Li ratio (i.e. more POSS-phenyl$_7$(BF$_3$Li)$_3$). The POSS-phenyl$_7$(BF$_3$Li)$_3$ has a dimension on the order of about 1 nm, and thus cannot account for the larger spherical domains. In regions of the TEM grid where the specimen was more dilute (FIG. 1A) there are clusters of POSS within the spherical domains. Energy dispersive X-ray analysis (data not shown) indicated that Si was only present in the POSS-phenyl$_7$(BF$_3$Li)$_3$ aggregates and not the PEO(600K) phase. Hydrophobic domain crystallization has also been observed in polymer electrolytes consisting of heptadecane functionalized poly(ethylene oxide) (PEO) methacrylate and lithium methacrylate (S. W. Ryu, *Polymer Journal* 2008, 40, 688).

It is believed that the morphology of POSS-phenyl$_7$(BF$_3$Li)$_3$/PEO is characterized as follows. During solution casting from a common solvent, the phenyl groups of PUSS-phenyl$_7$(BF$_3$Li)$_3$ crystallize. The Si—O—BF$_3$Li groups dissociate into Si—O—BF$_3^-$ and $Li^+$. The electronegative ether oxygens of the PEO solvate the dissociated $Li^+$ ions. Unlike the case of the POSS-PEG$_8$ in POSS-phenyl$_7$(BF$_3$Li)$_3$/POSS-PEG$_8$, which have low molecular weights and short PEG arm lengths, the PEO chains connect POSS-phenyl$_7$(BF$_3$Li)$_3$ aggregates.

Without wishing to be bound by any theory, it is suggested that $Li^+$ ions bridge Si—O—BF$_3$" and the ether oxygens of —(OCH$_2$CH$_2$)—, to form Si—O—BF$_3^-$—$Li^+$—OCH$_2$CH$_2$ physical crosslink sites in the PEO matrix, as has been suggested for ethylene-propylene-silsesquioxane thermoplastic elastomers (Seurer et al., *Macromolecular Chemistry and Physics* 2008, 209, 1198), but here effectively making instead a hard solid below about −120° C. With increased amount of POSS-phenyl$_7$(BF$_3$Li)$_3$, for example for O/Li=8/1, the PEO connects many aggregates, the chains become increasingly taut, crystallization is eliminated and the "tie chains" between the aggregates have reduced mobility and thus higher $T_g$s.

The POSS-phenyl$_7$(BF$_3$Li)$_3$/PEO is characterized by a high lithium ion transference number. As is observed (FIG. 2B), the value of 0.6 for POSS-phenyl$_7$(BF$_3$Li)$_3$/PEO (600K) is in fact higher than that measured in the POSS-PEG$_8$ electrolyte ($t_{Li+}$=0.5). Without wishing to the bound by any theory, it is believed that this increase results from the additional decrease in mobility due to crosslinking of the PEO, although it is also true that the amorphous PEO(600K) matrix would be more viscous than that of POSS-PEG$_8$.

It may be appreciated that the lithium ion transport number demonstrated for the POSS-phenyl$_7$(BF$_3$Li)$_3$/PEO (600K) is not that of a single ion conductor ($t_{Li+}$→1), since the POSS-phenyl$_7$(BF$_3^-$)$_3$ anions can move in the viscous PEO(600K) matrix. However, the $t_{Li+}$ recorded for POSS-phenyl$_7$(BF$_3$Li)$_3$/PEO(600K) is in the range observed upon addition of nanoparticles to PEO (Stephan et al., *Journal of Physical Chemistry B* 2009, 113, 1963; Croce et al., *Nature* 1998, 394, 456), for PEO intercalated into lithium exchanged nanoclays (Krawiec et al., *Journal of Power Sources* 1995, 54, 310. 9-32) or when polyanionic salts (Geiculescu et al., *Journal of Physical Chemistry B* 2006, 110, 23130) are used. Other self-assembled nanostructured block copolymers (e.g. PEO-b-PMMA-ran-PMAALi) (Berthier et al., *Solid State Ionics* 1983, 11, 91; Ghosh et al., *Journal of the Electrochemical Society* 2008, 155, A428) and siloxyaluminate polymers with PEG side chains (Doeff et al., *Solid State Ionics* 1998, 113, 109) also exhibited enhanced $t_{Li+}$ (0.7-0.9). Low values of conductivity in these systems despite high $t_{Li+}$ indicate that although the anions or anion complexes become immobile, the mobility of the cation does not improve. In stark contrast, the increase in $t_{Li+}$ for the POSS-phenyl$_7$(BF$_3$Li)$_3$/PEO of the present invention is not obtained at the expense of a decrease in conductivity.

In order to use electrolyte materials in lithium or lithium ion batteries, a wide electrochemical stability window and good interfacial properties are required, since lithium battery electrode chemistries operate at high voltages, and thus stability windows beyond the working voltage window of the electrodes prevent electrolyte side reactions and degradation. The SPEs of the present invention satisfy these requirements. Linear sweep voltammetry showed that the electrochemical stability window of POSS-phenyl$_7$(BF$_3$Li)$_3$/PEO(600 k) (O/Li=14/1) occurred at 4.6 V (data not shown). The SPEs are characterized by good interfacial stability. Interfacial stability with respect to lithium was measured for PUSS-phenyl$_7$(BF$_3$Li)$_3$/PEO(600K), O/Li=14/1 at 80° C. The results are presented in (FIG. 2C). The impedance spectra are represented as skewed semicircles, in which the intercept at high frequency, typically modeled as the ohmic resistance of the cell due to the electrolyte resistance (R$_{bulk}$), does not change (51Ω). The diameter of the semicircle, which first increases and then decreases with storage time, has contributions from both the resistance of the passivation film (R$_{passivation}$) and the charge-transfer resistance (R$_{CT}$). The resistance stabilizes after about 300 hours to a value only about 25% higher than its original low value of 500Ω, indicating that the solid electrolyte interface (SEI) layer formed with the POSS-phenyl$_7$(BF$_3$Li)$_3$/PEO(600K) has good passivation characteristics. Time dependence of interfacial resistance as a function of storage time is shown in FIG. 2D.

The solid polymer electrolyte structure formed by the POSS-phenyl$_7$(BF$_3$Li)$_3$/PEO blends of the present invention is formed by physical crosslink sites between the spherical aggregates and the matrix PEO/Li$^+$ chains, not by PEO crystallization. The physical, not chemical nature of the crosslinking has advantages in battery manufacture. The solid polymer electrolytes of the invention are readily formed by solvent casting, and thus can be incorporated into cathode materials and bonded with the electrolyte. The excellent electrochemical stability window (4.6 V) and interfacial stability with lithium makes these solid polymer electrolytes highly suitable for lithium battery applications.

The practice of the invention is illustrated by the following non-limiting examples.

EXAMPLES

Materials

Trisilanolphenyl POSS lithium salt (C$_{42}$H$_{35}$Li$_{30}$O$_{12}$Si$_7$ MW=949.15 g/mol), POSS-phenyl$_7$Li$_3$, was a gift from Hybrid plastics (Hattiesburg, Miss.). Polyethylene oxide (M$_n$=600K), acetonitrile (CH$_3$CN), dichloromethane and lithium ribbon (0.75 mm×19 mm) were obtained from Sigma Aldrich (St. Louis, Mo.). Before use CH$_3$CN was passed through two columns of neutral alumina and stored over molecular sieves in an MBRAUN Lab Master 130 glove box purged with argon.

Example 1

Preparation of POSS-phenyl$_7$(BF$_3$Li)$_3$/PEO(600K) Mixtures

POSS-phenyl$_7$(BF$_3$Li)$_3$ was synthesized and characterized as described by Chinnam, and Wunder, *Chemistry of Materials* 2011, 23, 5111. Briefly, stoichiometrically equivalent amounts of BF$_3$(OC$_2$H$_5$)$_2$ were added to dry (80° C./34 h/vacuum) POSS-phenyl$_7$Li$_3$ in an argon atmosphere at 25° C. and stirred for 1 hour. The reaction product, POSS-phenyl$_7$(BF$_3$Li)$_3$, was filtered and washed four times with a large excess of dichloromethane and dried (80° C./vacuum/ 24 h). Calculated amounts, based on O/Li ratios (only ether oxygens considered), of separate solutions of dry (65° C./2 days/vacuum) POSS-phenyl$_7$(BF$_3$Li)$_3$ and dry (65° C./2 days/vacuum) PEO in anhydrous acetonitrile, were mixed/stirred (6 hours), followed by slow removal of the acetonitrile (90° C./30 h/vacuum). When about half the solvent was evaporated (70° C.), 100-150 μm thick, 1 cm$^2$ area films were prepared by adding the solution drop-wise on a Teflon sheet with a 1 cm$^2$ Teflon O-ring (300 μm). The films were stored in a glove box at ambient temperature (36 hours) and then dried (90° C./16 h/vacuum). In this manner, POSS-phenyl$_7$(BF$_3$Li)$_3$/PEO films were prepared with oxygen/lithium ratios (considering only ether oxygens) of 8/1, 10/1, 12/1, 14/1 and 16/1. All films were hard solids both at room temperature and at 90° C.

Example 2

Differential Scanning Calorimetry of POSS-phenyl$_7$(BF$_3$Li)$_3$/PEO(600K)

Figure 3A:
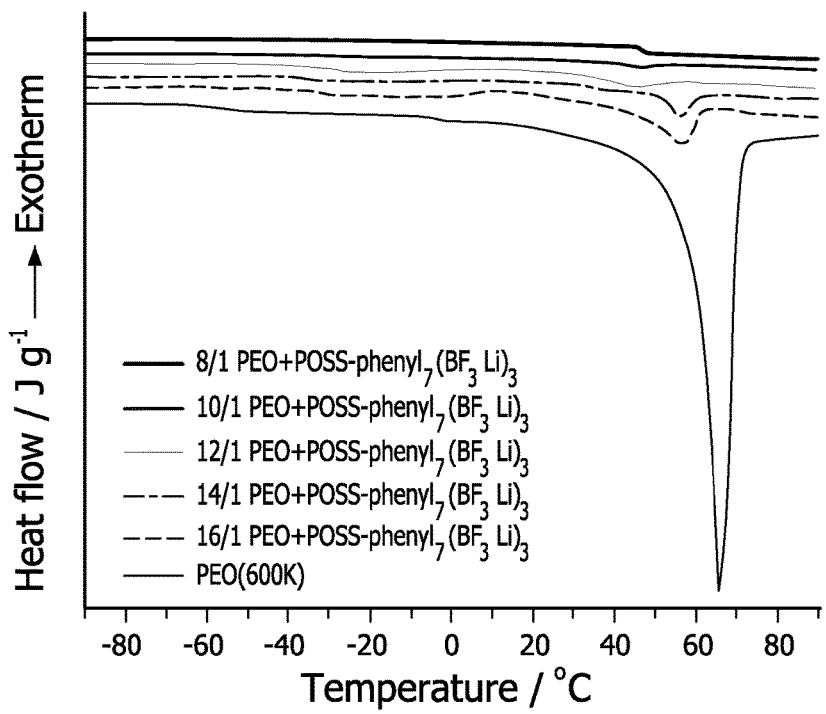
FIG. 3A shows differential scanning calorimetry (DSC) scans of neat PEO(600K) and POSS-phenyl$_7$(BF$_3$Li)$_3$/PEO (600K) as a function of Li/O ratio.
Figure 3B:
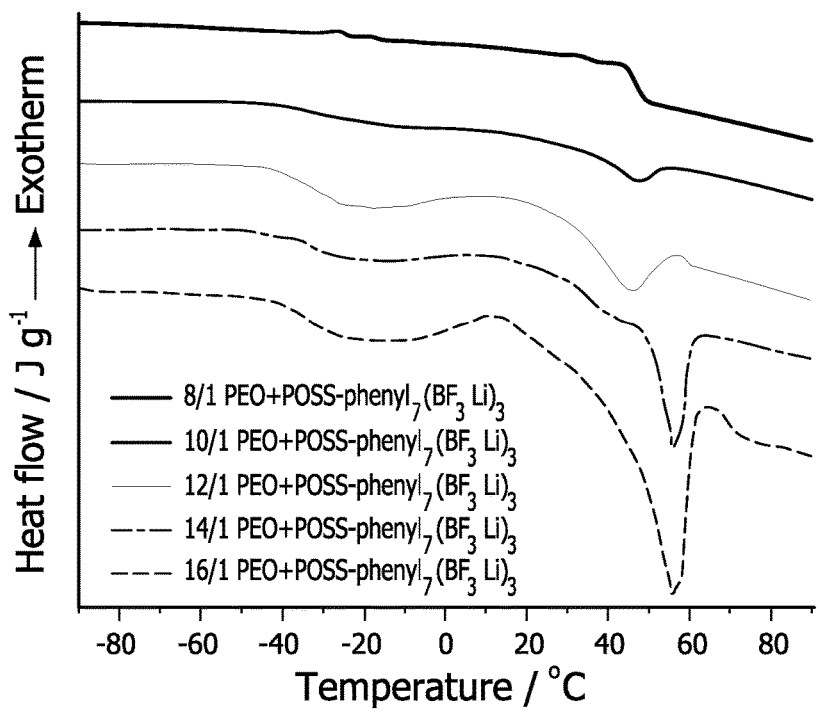
FIG. 3B is similar to FIG. 3A and shows DSC scans without neat PEO(600K).

Differential scanning calorimetry (DSC) scans were made on POSS-phenyl$_7$(BF$_3$Li)$_3$/PEO(600K) as a function of Li/0 ratio. Scans were made on a TA Instruments Hi-Res DSC 2920 at 10° C./min under N$_2$. The results are shown in FIG. 3A (second heating cycle) for a neat PEO(600K) and POSS-phenyl$_7$(BF$_3$Li)$_3$/PEO(600K), and FIG. 3B for DSC scans without neat PEO(600K).

Example 3

Transmission Electron Microscopy of POSS-phenyl$_7$(BF$_3$Li)$_3$/PEO(600K)

Transmission electron microscope (TEM) images were obtained on a JEOL JEM 1400 EM with an operating voltage of 80 KeV, and equipped with energy dispersive X-ray analysis (EDX). Aliquots of POSS-phenyl$_7$(BF$_3$Li)$_3$/PEO(600K) in anhydrous acetonitrile were placed on copper grids (PELCO extra open area, center marked, 400 mesh, 3.0 mm O. D., Ted Pella, Inc., Redding, Calif.) and air-dried overnight. Images were captured using a Gatan Ultraacan 1000 CCD Camera (2K×2K pixels). Image capture (Gatan DualVision 300 (1 k), side-entry cooled CCD camera, or a Gatan Outer SCAN 1000 CCD Camera), processing, and analysis were performed with Gatan Digital Micrograph software. Results are shown in FIGS. 1A (O/Li=14/1) and 1B (O/Li=10/1).

Example 4

Wide Angle X-ray Scattering Analysis of POSS-phenyl$_7$(BF$_3$Li)$_3$/PEO(600K)

Figure 3C:
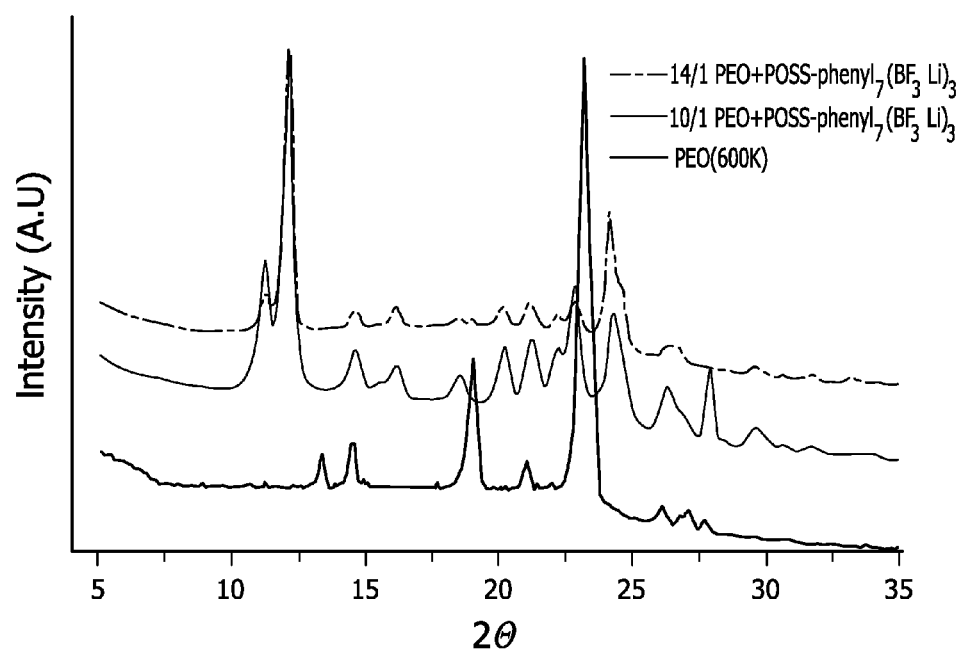
FIG. 3C shows wide angle x-ray scattering (WAXS) data for neat PEO(600K) and POSS-phenyl$_7$(BF$_3$Li)$_3$/PEO (600K) with O/Li=14/1 and 10/1.

Wide angle x-ray scattering (WAXS) data was obtained using a Bruker AXS D8 Discover x-ray diffractometer. The results are shown in FIG. 3(C) for neat PEO(600K) and POSS-phenyl$_7$(BF$_3$Li)$_3$/PEO(600K) with O/Li=14/1 and 10/1.

Example 5

Electrochemical Characterizations of POSS-phenyl$_7$(BF$_3$Li)$_3$/PEO(600K)

Electrochemical characterization was performed with a HF Frequency Response Analyzer (Schlumberger model SI 1255) in combination with a potentiostat/galvanostat (EG&G Princeton Applied Research PAR model 273A) in the frequency range from 0.01 to 100 kHz, controlled through Z-Plot software (Scribner Associates, Inc.). Temperature dependent ionic conductivities were measured as described by Chinnam, and Wunder, *Chemistry of Materials* 2011, 23, 5111, with POSS-phenyl$_7$(BF$_3$Li)$_3$/PEO(600K) SPEs sandwiched between two 1 cm$^2$ stainless steel blocking electrodes. Electrolyte conductivities were obtained from the intercepts (resistances, R) of the slanted lines with the real axis, using σ=l/RA, where l is the thickness of the electrolyte film and A=area of film=1 cm$^2$.

Interfacial stability and lithium ion transport numbers were measured using the same cell but with symmetric non-blocking lithium electrodes, both at 80° C. Lithium ion transference number was obtained using the modified steady-state current method (Evans et al., *Polymer* 1987, 28, 2324):

$$t_{Li+}=I_{ss}(\Delta V-I_oR_o)/I_o(\Delta V-I_sRss)$$

or the same but multiplied by $R_{ss}/R_o$ (however, $R_{ss}$~$R_o$) (Abraham et al., *Chemistry of Materials* 1997, 9, 1978).

A DC pulse (ΔV) of 10 mV was used to polarize the cell, and the initial current, $I_o$, and resistance, $R_o$ and final, steady state, $I_{ss}$, $R_{ss}$ values measured.

Figure 2B:
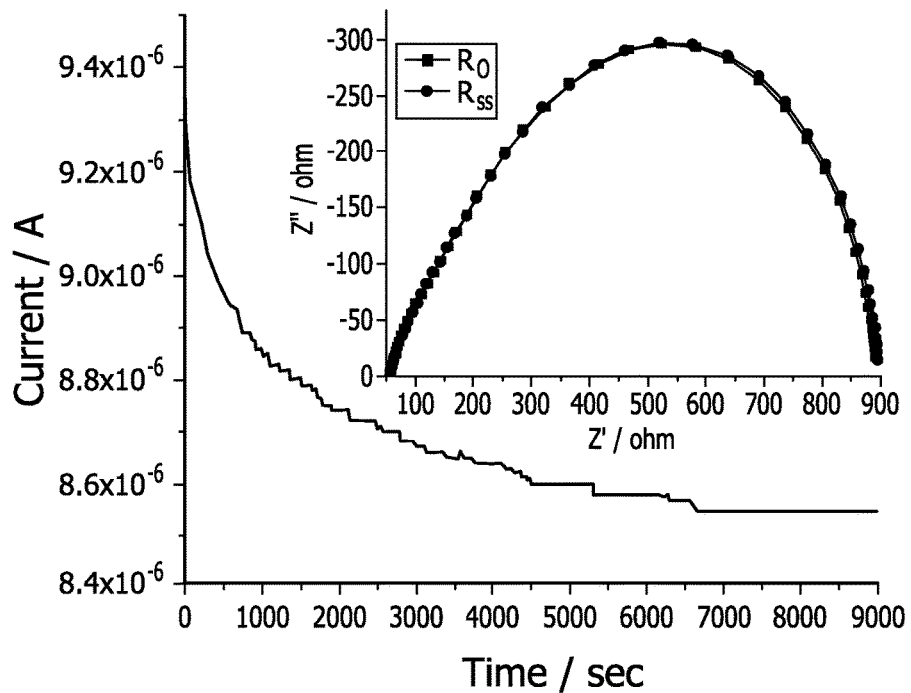
FIG. 2B shows the variation of current (I) with time during polarization of a Li°/POSS-phenyl$_7$(BF$_3$Li)$_3$/PEO (600K) (O/Li=14/1)/Li° cell at 80° C., with an applied potential difference of 10 mV. The inset in FIG. 2B shows Cole-Cole plots taken initially (I$_o$) and when the current had reached the steady state value (I$_{ss}$).
Figure 2C:
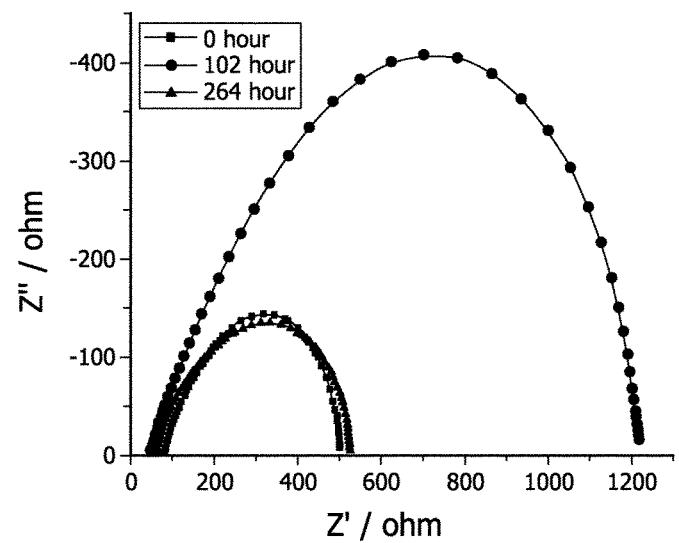
FIG. 2C shows select impedance (Cole-Cole) plots of a Li°/POSS-phenyl$_7$(BF$_3$Li)$_3$/PEO(600K) (O/Li=14/1)/Li° cell (open circuit potential) as a function of storage time at 80° C.
Figure 2D:
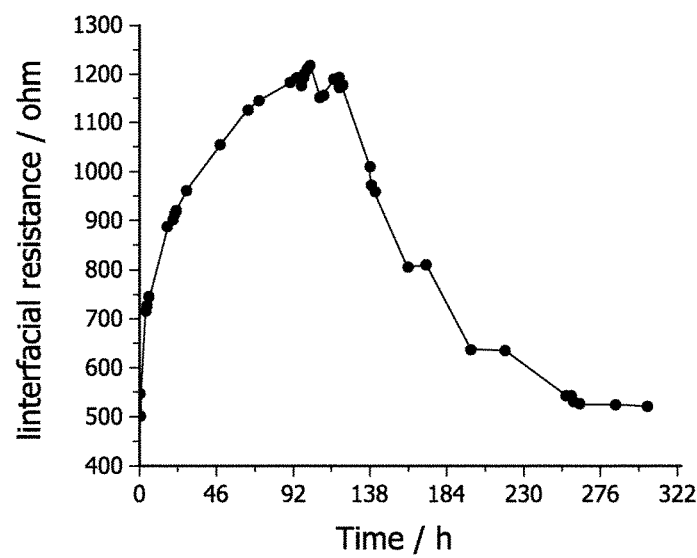
FIG. 2D shows the time dependence of interfacial resistance as a function of storage time at 80° C.

The results of these studies are shown in FIGS. 2A-2D. FIG. 2A shows the log (conductivity, σ) versus 1000/T for POSS-phenyl$_7$(BF$_3$Li)$_3$/PEO(600K) as a function of O/Li ratio. FIG. 2B shows the variation of current (I) with time during polarization of a Li°/POSS-phenyl$_7$(BF$_3$Li)$_3$/PEO (600K) (O/Li=14/1)/Li° cell at 80° C., with an applied potential difference of 10 mV. The inset in FIG. 2B shows Cole-Cole plots taken initially ($I_o$) and when the current had reached the steady state value ($I_{ss}$). FIG. 2C shows select impedance (Cole-Cole) plots of a Li°/POSS-phenyl$_7$ (BF$_3$Li)$_3$/PEO(600K) (O/Li=14/1)/Li° cell (open circuit potential) as a function of storage time at 80° C. FIG. 2D shows the time dependence of interfacial resistance as a function of storage time at 80° C.

The disclosures of each and every patent, patent application, and publication cited herein are hereby incorporated herein by reference in their entirety. One skilled in the art will readily appreciate that the present invention is well adapted to carry out the objects and obtain the ends and advantages mentioned, as well as those inherent therein. While the invention has been disclosed with reference to specific embodiments, it is apparent that other embodiments and variations of this invention may be devised by others skilled in the art without departing from the true spirit and scope used in the practice of the invention. The appended claims are intended to be construed to include all such embodiments and equivalent variations.

What is claimed is:

1. A composition comprising:
   (a) polyoctahedral silsesquioxane-phenyl$_7$(BF$_3$Li)$_3$, having the formula:

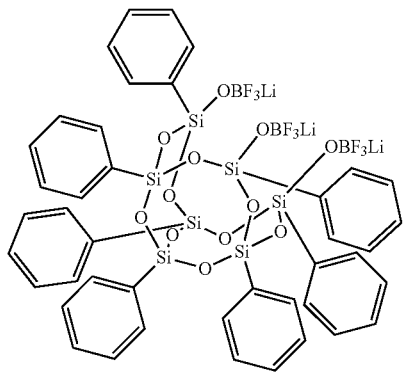

and
(b) at least one poly(ethylene oxide).

2. A composition according to claim 1 wherein the at least one poly(ethylene oxide) has a viscosity average molecular weight of from about 100K to about 1000K.

3. A composition according to claim 2 wherein the at least one poly(ethylene oxide) has a viscosity average molecular weight of from about 200K to about 800K.

4. A composition according to claim 3 wherein the at least one poly(ethylene oxide) has a viscosity average molecular weight of from about 400K to about 800K.

5. A composition according to claim 4 wherein the at least one poly(ethylene oxide) has a viscosity average molecular weight of about 600K.

6. A composition according to claim 1, having an oxygen to lithium ratio of from about 4:1 to about 20:1, considering only ether oxygens in determining said ratio.

7. A composition according to claim 6, having an oxygen to lithium ratio of from about 6:1 to about 18:1.

8. A composition according to claim 7, having an oxygen to lithium ratio of from about 8:1 to about 16:1.

9. A composition according to claim 8, having an oxygen to lithium ratio of about 8:1.

10. A composition according to claim 8, having an oxygen to lithium ratio of about 10:1.

11. A composition according to claim 8, having an oxygen to lithium ratio of about 12:1.

12. A composition according to claim 8, having an oxygen to lithium ratio of about 14:1.

13. A composition according to claim 8, having an oxygen to lithium ratio of about 16:1.

14. A composition according to claim 1, which has a percent crystallinity of less than about 4%.

15. A composition according to claim 14, which has a percent crystallinity of less than about 1%.

16. A composition according to claim 1 which is a solid at room temperature.

17. A composition according to claim 1 wherein chains of poly(ethylene oxide) connect aggregates of polyoctahedral silsesquioxane-phenyl(BF$_3$Li)$_3$.

18. A composition according to claim 1, formed from self-assembly of said polyoctahedral silsesquioxane-phenyl$_7$ (BF$_3$Li)$_3$ and said at least one poly(ethylene oxide).

19. A process for forming a solid composition comprising:
   (i) mixing in a solvent polyoctahedral silsesquioxane-phenyl$_7$(BF$_3$Li)$_3$, having the formula:

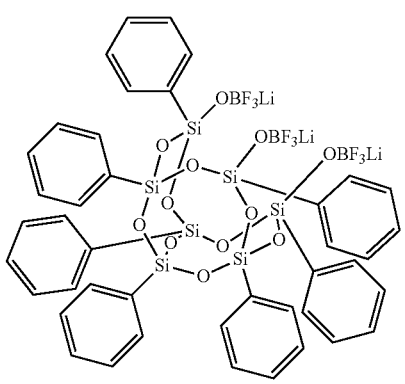

and at least one poly(ethylene oxide), and
(ii) removing said solvent to form said solid composition.

20. The process according to claim 19, wherein the solvent is acetonitrile.

21. The process according to claim 19, resulting in the formation of a film.

22. A solid polymer electrolyte formed by the process of claim 19.

23. A solid polymer electrolyte formed by self-assembly of:
(a) polyoctahedral silsesquioxane-phenyl$_7$(BF$_3$Li)$_3$, having the formula:

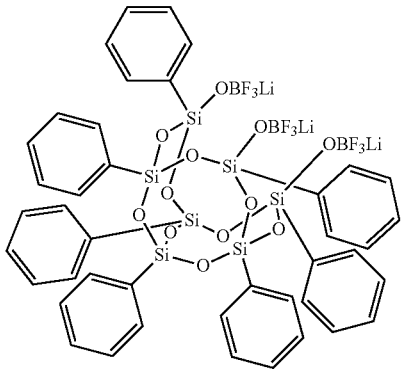

and
(b) at least one poly(ethylene oxide).

24. A solid polymer electrolyte according to claim 23, wherein Si—O—BF$_3$Li groups of said polyoctahedral silsesquioxane-phenyl(BF$_3$Li)$_3$ are dissociated into Si—O—BF$_3^-$ ions and Li$^+$ ions, and said Li$^+$ ions are solvated by said at least one poly(ethylene oxide).

25. The solid polymer electrolyte according to claim 23 wherein phenyl groups of said polyoctahedral silsesquioxane-phenyl$_7$(BF$_3$Li)$_3$ comprise nanometer-sized clusters in said solid polymer electrolyte.

26. The solid polymer electrolyte according to claim 23 wherein Li$^+$ ions bridge Si—OBF$_3^-$ groups of said polyoctahedral silsesquioxane-phenyl(BF$_3$Li)$_3$ and ether oxygens of —(OCH$_2$CH$_2$)— groups of said polyoctahedral silsesquioxane-phenyl(BF$_3$Li)$_3$ to form Si—O—BF$_3^-$—Li$^+$—(OCH$_2$CH$_2$)$_n$ linkages in said solid polymer electrolyte.

27. The solid polymer electrolyte according to claim 23, wherein the at least one poly(ethylene oxide) has a viscosity average molecular weight of from about 100K to about 1000K.

28. The solid polymer electrolyte according to claim 27, wherein the at least one poly(ethylene oxide) has a viscosity average molecular weight of from about 200K to about 800K.

29. The solid polymer electrolyte according to claim 28, wherein the at least one poly(ethylene oxide) has a viscosity average molecular weight of from about 400K to about 800K.

30. The solid polymer electrolyte according to claim 29, wherein the at least one poly(ethylene oxide) has a viscosity average molecular weight of about 600K.

31. The solid polymer electrolyte according to claim 23, having an oxygen to lithium ratio of from about 4:1 to about 20:1, considering only ether oxygens in determining said ratio.

32. The solid polymer electrolyte according to claim 31, having an oxygen to lithium ratio of from about 6:1 to about 18:1.

33. The solid polymer electrolyte according to claim 32, having an oxygen to lithium ratio of from about 8:1 to about 16:1.

34. The solid polymer electrolyte according to claim 33 having an oxygen to lithium ratio of about 8:1.

35. The solid polymer electrolyte according to claim 33 having an oxygen to lithium ratio of about 10:1.

36. The solid polymer electrolyte according to claim 33 having an oxygen to lithium ratio of about 12:1.

37. The solid polymer electrolyte according to claim 33 having an oxygen to lithium ratio of about 14:1.

38. The solid polymer electrolyte according to claim 33 having an oxygen to lithium ratio of about 16:1.

39. The solid polymer electrolyte according to claim 23, which has a percent crystallinity of less than about 4%.

40. The solid polymer electrolyte according to claim 39, which has a percent crystallinity of less than about 1%.

41. A battery comprising a solid electrolyte according to claim 23.

* * * * *